United States Patent
Evans et al.

(10) Patent No.: US 10,116,411 B1
(45) Date of Patent: Oct. 30, 2018

(54) FREQUENCY AGILE ANTI-JAM DATA LINK

(71) Applicant: NORTHROP GRUMMAN SYSTEMS CORPORATION, Falls Church, VA (US)

(72) Inventors: David W. Evans, Signal Hill, CA (US); Jeffrey M. Yang, Signal Hill, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 119 days.

(21) Appl. No.: 15/249,274

(22) Filed: Aug. 26, 2016

(51) Int. Cl.
*H04K 3/00* (2006.01)
*H04B 7/185* (2006.01)
*H04W 72/04* (2009.01)

(52) U.S. Cl.
CPC ........... *H04K 3/22* (2013.01); *H04B 7/18506* (2013.01); *H04W 72/0453* (2013.01)

(58) Field of Classification Search
CPC .. H04K 3/22; H04B 7/18506; H04W 72/0453
See application file for complete search history.

(56) References Cited

U.S. PATENT DOCUMENTS

| | | | |
|---|---|---|---|
| 5,381,150 A | 1/1995 | Hawkins et al. | |
| 5,984,239 A | 11/1999 | Chen | |
| 6,061,562 A | 5/2000 | Martin et al. | |
| 6,768,465 B2 | 7/2004 | Stewart, II | |
| 6,771,929 B1 | 8/2004 | Nivens et al. | |
| 7,454,202 B2 | 11/2008 | de La Chapelle | |
| 7,505,736 B2 | 3/2009 | Min | |
| 7,626,538 B2 | 12/2009 | Rose | |
| 8,362,884 B2 | 1/2013 | Duge | |
| 8,442,519 B2 | 5/2013 | Cruz et al. | |
| 8,594,662 B2 | 11/2013 | Hadinger | |
| 8,976,837 B1 | 3/2015 | Lomp et al. | |
| 2012/0200454 A1* | 8/2012 | Hadinger | H04B 7/18508 342/352 |
| 2013/0307715 A1 | 11/2013 | Davis et al. | |
| 2014/0045420 A1 | 2/2014 | Tong et al. | |
| 2015/0304885 A1 | 10/2015 | Jalali | |
| 2016/0143016 A1* | 5/2016 | Chanclou | H04W 24/02 370/329 |
| 2017/0171774 A1* | 6/2017 | Bercovici | H04W 28/048 |

OTHER PUBLICATIONS

Lange, J. B. "The Relative Nature of Low Probability of Detection Radar a Countermeasures Perspective" Technical Memorandum, DRDC Ottawa TM 2012-186, Canada, Dec. 2012, 26 pgs.
Fougias, Charalampos et al. "Netted LPI Radars" Thesis, Naval Postgraduate School, Monterey, California, Sep. 2011, 295 pgs.
Denk, Aytug, "Detection and Jamming Low Probability of Intercept (LPI) Radars" Thesis, Naval Postgraduate School, Monterey, California, Sep. 2006, 105 pgs.

* cited by examiner

*Primary Examiner* — Jianye Wu
(74) *Attorney, Agent, or Firm* — John A. Miller; Shumaker, Loop & Kendrick, LLP

(57) ABSTRACT

A method for sending messages through the atmosphere. The method includes sending the messages to an intended recipient, such as an aircraft, on a data link over an operating frequency at or near an atmospheric absorption band, where the operating frequency is selected to be closer to or farther from the absorption band to control the attenuation of the messages in the atmosphere so that the intended recipient is able to receive the messages, but unintended recipients are unable to receive the messages or jamming signals are unable to jam the messages.

17 Claims, 2 Drawing Sheets

FREQUENCY AGILE ANTI-JAM DATA LINK

BACKGROUND

Field

This invention relates generally to a system and method for providing a frequency agile communications link between airborne vehicles and, more particularly, to a system and method for providing a frequency agile communications link between airborne vehicles that includes selectively sending messages over the link at frequencies at or around an atmospheric absorption band to control the amount of attenuation of the messages in the atmosphere to allow intended recipients that are at a relatively close distance to the transmitting vehicle to receive the messages, but prevent farther away unintended recipients from receiving the messages and/or preventing jamming signals.

Discussion

Various aircraft, including both commercial and military aircraft, such as unmanned aerial vehicles (UAV), may communicate with each other, with satellites orbiting the Earth, and with ground stations over various data and communications links, such as the 20-30 GHz Ka frequency band, the 12-15 GHz Ku frequency band, the 1-2 GHz L frequency band, the 33-50 GHz Q frequency band, etc. Typically these communications and data links are based on line-of-sight and operate at a frequency band that minimizes attenuation of the signals in the atmosphere to maximize the operating range of the link and the data rate of the link. These aircraft may operate at different altitudes, over different ranges and with different capabilities. For example, tactical UAVs nominally operate within line-of-sight of their launch location, and control stations, strategic reconnaissance and strike platforms typically operate beyond line-of-sight and rely on relay links to maintain mission connectivity.

In addition to organic intelligence, data gathering and strike roles, UAVs are now being employed into relay roles that extend communications to greater distances or beyond terrain blockages to traditional forces and even to other unmanned systems. Satellite communications signals provide tremendous reach and coverage for UAVs in areas denied to ground forces, but such communications often result in increased vulnerability, where the greater the distance or broader the communications area, the greater the potential exposure to counter measures, such as signal jamming. Furthermore, signals transmitted from aircraft are subject to detection by sensitive equipment on the ground. Intercept of these signals may permit evaluation of aircraft or spacecraft operations and potentially expose sensitive information.

Various techniques are known in the art for minimizing or eliminating jamming signals. However, such techniques often have undesirable consequences and limitations. For example, it is known to provide frequency hopping or spread spectrum transmitters that change their transmission frequency in an attempt to operate at frequencies other than the frequency of the jamming signal. However, the jam-resistance of these spread spectrum techniques is inversely related to the bandwidth of the signal, where the wider the transmission bandwidth, the less effective the spectrum spreading becomes. Further, as communications between aircraft require more bandwidth, possibly on the order of 100 mega bits per second, the limitations of spread spectrum transmitters increases. It is also known in the art to employ nulling antennas where the antenna gain pattern of the transmitter is designed to have a null (no gain) in the direction that the jamming signal may be originating from. However, if the intended transmitter of signals to the spacecraft is proximate to or in-line with the jamming location, then it will also not receive the transmitted signal.

It is often desirable for certain aircraft flying in relative close proximity to each other to send messages to each other over a communications link to exchange data and other information. Often times, the signals are transmitted at a high power level where if the aircraft are close enough, the signal-to-noise ratio from the transmitter to the receiver is very high, possibly saturating the receiver. In those situations, some communications systems automatically reduce the power of the transmit signal, which still allows the desired receiver to receive the signal, but reduces the ability of other, possibly unfriendly, receivers from receiving the signal.

It is known in the art that signals at or around 60 GHz within the 40-75 V-band are readily absorbed in the atmosphere. Particularly, oxygen molecules ($O_2$) in the air have electron orbits including resonant frequencies at or around 60 GHz that cause radiation at 60 GHz to be absorbed in the atmosphere. This absorption is so great that very high powered signals in this frequency band are only able to travel a short distance through the air. Thus, an aircraft that is able to receive signals at 60 GHz will not see such transmission signals from the ground because those signals will be absorbed by the atmosphere within a short distance.

Certain aircraft, and in particular military aircraft, sometimes fly at the edge of the Earth's atmosphere, such as 60,000 feet or above, and sometimes communicate with each over a data link that is in an atmospheric absorption band where the air is too thin to significantly attenuate the signals transmitted between the aircraft. However, the signals are absorbed in the atmosphere below the aircraft and are not able to be received by lower flying aircraft or unfriendly ground stations, and are also not able to be jammed by jamming signals from the ground.

SUMMARY

The present invention discloses and describes a method for sending messages through the atmosphere. The method includes sending the messages to an intended recipient, such as an aircraft, on a data link over an operating frequency at or near an atmospheric absorption band, where the operating frequency is selected to be closer to or farther from the absorption band to control the attenuation of the messages in the atmosphere so that the intended recipient is able to receive the messages, but farther away unintended recipients are unable to receive the messages or jamming signals are unable to jam the messages.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for selecting the transmission frequency of a data link around an atmospheric absorption band to provide signal attenuation that allows communications between aircraft, but prevents jamming signals and unintended recipients from receiving the signals is merely exemplary in nature, and is in no way intended to limit the invention or its applications or uses.

As mentioned, aircraft that are communicating with each other and are relatively close sometimes reduce transmit power of communications signals so as to reduce the likelihood that an unintended recipient will receive the signals that may be some distance away from the intended recipient. Instead of performing this operation, the present invention proposes sending messages between aircraft on a data link over an operating frequency at or near an atmospheric absorption band, where the operating frequency is selected to be closer to or farther from the absorption band to control the attenuation of the messages in the atmosphere so that the intended recipient is able to receive the messages, but farther away unintended recipients are unable to receive the messages or jamming signals are unable to jam the messages. Thus, if the intended recipient is close to the transmitting aircraft, it may receive the messages with a high enough signal-to-noise ratio, but the unintended recipient who may not be close to the transmitting aircraft will not be able to receive the messages with a high enough signal-to-noise ratio because of the attenuation of the message in the atmosphere and other factors, such as signal spreading. Therefore, by moving the frequency of the data link around the absorption band so that less or more attenuation occurs, the amplitude of the transmit signal is controlled in a manner that allows the intended recipient to adequately receive the signals based on the distance therebetween, the angle therebetween and the altitude in the Earth's atmosphere, but prevent farther away unintended recipients from receiving the signals and to prevent signal jamming. In other words, signal attenuation is controlled using small movements in the link carrier frequency, which provides the maximum attenuation of intercepted signals for receivers listening at distances greater than the intended link distance. This process also tends to quickly suppress side-lobes and back-lobes. The frequency agile communications system discussed herein can provide ultra-wideband frequency hop, higher carrier frequency for wideband waveform spread with highly directed beams, and the ability to operate in a low/high attenuation atmospheric window to maximize range and minimized ground-based jammer effectiveness.

Figure 1:
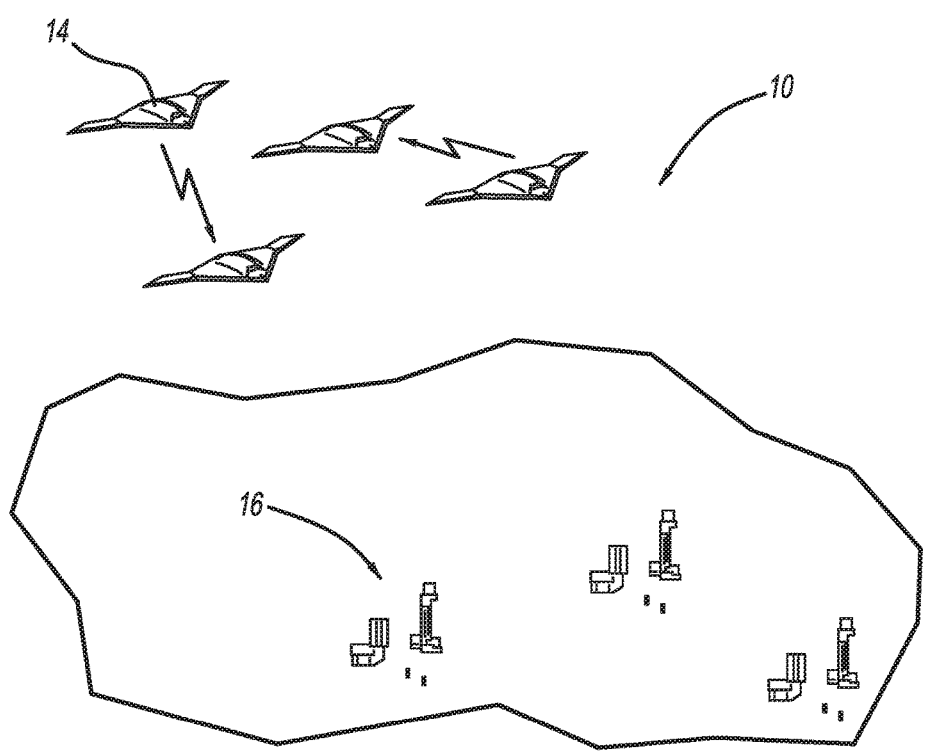
FIG. 1 is an illustration of a number of aircraft communicating with each over a frequency agile data link.

FIG. 1 is an illustration 10 of, for example, a warfare theater showing a number of joint unmanned combat air system (J-UCAS) aircraft 14 flying in a tactile formation relative to each other and possibly engaging one or more ground facilities 16. Although the aircraft 14 are specifically shown as J-UCAS in this non-limiting embodiment, the aircraft 14 are intended to represent any aircraft communicating with other aircraft, or with ground stations or satellites, in the frequency band being discussed herein, whether that purpose is a military purpose, civilian purpose or otherwise. Further, each of the aircraft 14 includes a suitable communications system for transmitting and receiving data and messages over a communications link, also at the frequency bands being discussed herein.

Figure 2:
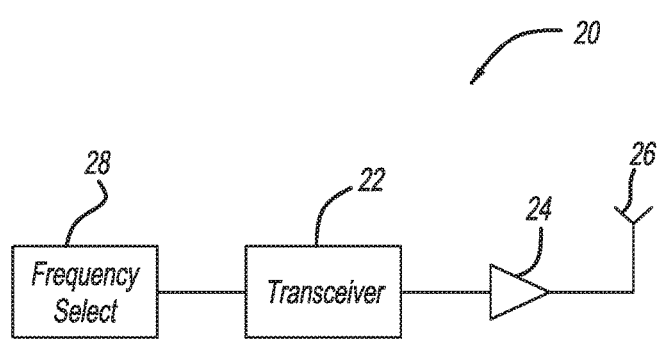
FIG. 2 is a block diagram of a communications system that can be provided on the aircraft shown in FIG. 1.

FIG. 2 is a simplified representation of a communications system 20 that could be on the aircraft 14 and that includes a transceiver 22, an amplifier 24 and an antenna 26. A frequency select box 28 can change the transmission frequency of the data messages that are transmitted consistent with the discussion herein. The antenna 26 is intended to represent any antenna suitable for the purposes discussed herein including highly directional antennas, phased array antennas, dish antennas, dipole antennas, etc. The communications system 20 can operate in the digital domain and the analog domain, provide relay data, provide command and control messages, provide attack coordination messages, provide target validation messages, etc., and at any suitable data rate, such as kilobits per second, 10 megabits per second, gigabits per second, etc., and over desired distances.

Figure 3:
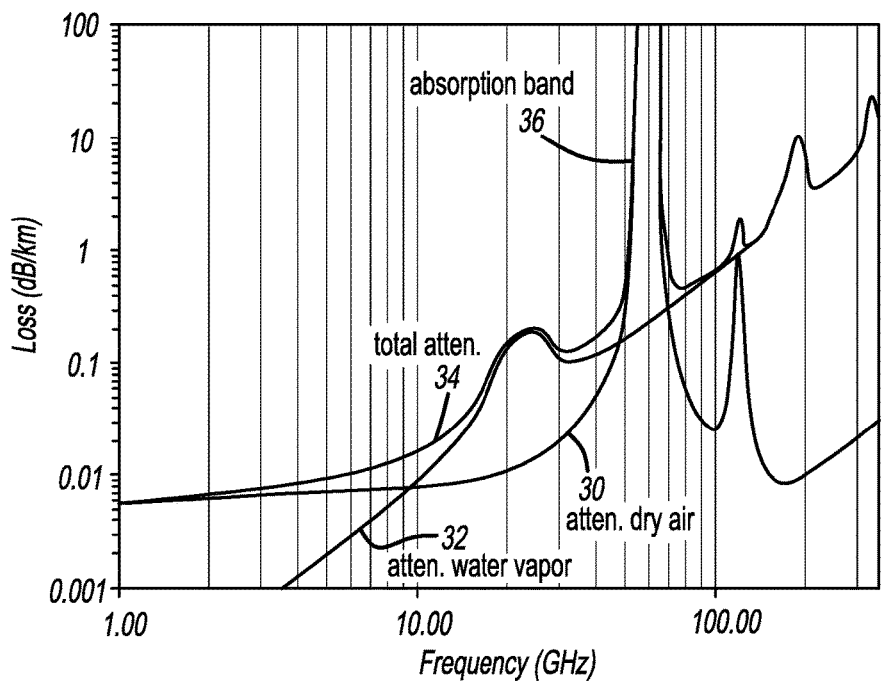
FIG. 3 is a graph with frequency on the horizontal axis and loss on the vertical axis showing an atmospheric absorption band.

FIG. 3 is a logarithmic graph with frequency in GHz on the horizontal axis and signal loss in dB per km on the vertical axis. The graph shows signal attenuation in the atmosphere at various frequencies including attenuation by dry air on graph line 30, attenuation by water vapor on graph line 32 and total attenuation on graph line 34. The graph lines 30 and 34 show that there is an atmospheric absorption band 36 around 60 GHz in the V-band, where signal attenuation exceeds 100 db/km, and where signals transmitted at this frequency would not travel very far in the atmosphere even at very high power. It is noted that as the altitude in the atmosphere increases, the density of the air molecules decreases, which reduces the attenuation. Therefore, signals transmitted within this portion of the V-band are significantly attenuated, i.e., over 100 dB, which would prevent signals from being received at any appreciable distance in that frequency.

By selecting the modulation frequency of the signals being transmitted, for example, between the aircraft 14 to be at or near the absorption band 36, the transmitted signals can be attenuated by the atmosphere a desired amount so that intended recipients receive the signals, but farther away unintended recipients do not. The transmitting and receiving aircraft 14 communicate with each other to determine the proper amount of signal attenuation for the particular situation. Generally, the frequency of the signals being transmitted is selected to have the highest attenuation that still allows the signals to be received by the intended recipient. Thus, the modulation frequency of the signals being transmitted can be changed relative to the absorption band 36 so that the signals are attenuated a certain amount in the atmosphere and are only able to be received a short distance from the transmitting aircraft. Many factors can go into determining the selected frequency at or near the absorption band 36, such as the altitude of the aircraft 14, the distance to the intended recipients, whether a jamming signal is detected, whether sensitive data is to be transmitted, whether an unintended recipient is detected, etc. Therefore, the frequency selector 28 can select the modulation frequency of the communications link depending on the desired level of attenuation in different situations so that the signals are not jammed, have a low probability of intercept (LPI) and have low probability of detection (LPD).

Figure 4:
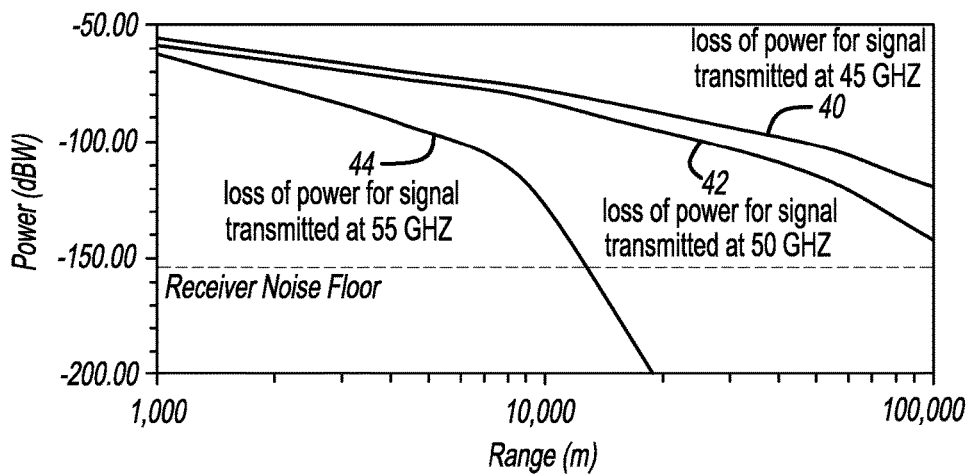
FIG. 4 is a graph with range on the horizontal axis and power on the vertical axis showing received jammer power at different ranges.

FIG. 4 is a graph with range in meters on the horizontal axis and power in dBW on the vertical axis illustrating reducing the effectiveness of a jammer signal operating in the absorption band 36. Graph line 40 represents the loss of power over a distance of 1000-100,000 meters for a signal transmitted at 45 GHz in the atmosphere, graph line 42 represents the loss of power over a distance of 1000-100,000 meters for a signal transmitted at 50 GHz in the atmosphere, and graph line 44 represents the loss of power over a distance of 1000-100,000 for a signal transmitted at 55 GHz in the atmosphere. As shown, by moving the communications link frequency from 45 GHz to 55 GHz, the system is able to reduce the jammer transmit power received by greater than 100 dB at 20 km, and suppress it below the receive noise floor. Since the aircraft 14 will typically be operating at 20,000-40,000 feet, there is minimum atmospheric attenuation and hence the communications link will continue to operate.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for transmitting signals through the atmosphere, said method comprising:
   sending messages to an intended recipient on a data link at an operating frequency that is close enough to an atmospheric absorption band to cause attenuation of the messages; and
   controlling the operating frequency of the data link relative to the absorption band to increase or decrease the attenuation of the messages in the atmosphere in a manner that increases or decreases the signal-to-noise ratio of the messages received by the intended recipient so that the intended recipient of the messages does receive the messages, but unintended recipients of the messages that are farther away from a transmit location of the messages than the intended recipient do not receive the message, wherein controlling the operating frequency of the data link relative to the absorption band includes changing the operating frequency depending on an altitude of the transmit location of the messages, a distance of the intended recipient from the transmit location, and a distance of the unintended recipients from the transmit location.

2. The method according to claim 1 wherein the operating frequency is in the frequency range of 40-75 GHz.

3. The method according to claim 2 wherein the absorption band is around 60 GHz.

4. The method according to claim 1 further comprising detecting that a jamming signal is present that is intended to jam the data link, and wherein controlling the operating frequency of the data link relative to the absorption band includes changing the operating frequency of the data link to increase the attenuation if the jamming signal is detected.

5. The method according to claim 1 further comprising providing messages between the transmit location and the intended recipient that determine the operating frequency of the data link.

6. The method according to claim 1 wherein the messages are sent by an aircraft.

7. The method according to claim 6 wherein the intended recipient is another aircraft.

8. The method according to claim 6 where the aircraft is an unmanned aircraft.

9. The method according to claim 6 wherein the aircraft is a fighter aircraft.

10. The method according to claim 6 wherein the unintended recipient is an aircraft.

11. The method according to claim 6 wherein the unintended recipient is a ground station.

12. A method for transmitting messages through the atmosphere from a first aircraft to a second aircraft, said method comprising:
    sending messages from the first aircraft to the second aircraft on a data link at an operating frequency that is close enough to an atmospheric absorption band to cause attenuation of the messages;
    providing messages between the first aircraft and the second aircraft that determine the operating frequency of the data link; and
    controlling the operating frequency of the data link relative to the absorption band using the messages that determine the operating frequency to increase or decrease attenuation of the messages in the atmosphere in a manner that continues to allow the messages to be received by the second aircraft, but unintended recipients of the messages that are farther away from the first aircraft than the second aircraft do not receive the message, wherein controlling the operating frequency of the data link relative to the absorption band includes changing the operating frequency depending on an altitude of the first aircraft, a distance of the second aircraft from the first aircraft, and a distance of the unintended recipients from the first aircraft.

13. The method according to claim 12 wherein the operating frequency is in the frequency range of 40-75 GHz.

14. The method according to claim 13 wherein the absorption band is around 60 GHz.

15. A system for transmitting messages through the atmosphere from a first aircraft to a second aircraft, said system comprising:
    means for sending messages from the first aircraft to the second aircraft on a data link at an operating frequency that is close enough to an atmospheric absorption band to cause attenuation of the messages;
    means for providing messages between the first aircraft and the second aircraft that determine the operating frequency of the data link; and
    means for controlling the operating frequency of the data link relative to the absorption band using the messages that determine the operating frequency to increase or decrease attenuation of the messages in the atmosphere in a manner that continues to allow the messages to be received by the second aircraft, but unintended recipients of the messages that are farther away from the first aircraft than the second aircraft do not receive the message, wherein controlling the operating frequency of the data link relative to the absorption band includes changing the operating frequency depending on an altitude of the first aircraft, a distance of the second aircraft from the first aircraft, and a distance of the unintended recipients from the first aircraft.

16. The system according to claim 15 wherein the operating frequency is in the frequency range of 40-75 GHz.

17. The system according to claim 16 wherein the absorption band is around 60 GHz.

* * * * *